(12) United States Patent
Matsuki

(10) Patent No.: US 7,462,975 B2
(45) Date of Patent: Dec. 9, 2008

(54) ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/880,202

(22) Filed: Jul. 20, 2007

(65) Prior Publication Data

US 2008/0018202 A1    Jan. 24, 2008

(30) Foreign Application Priority Data

Jul. 20, 2006    (JP)    ............... 2006-198257

(51) Int. Cl.
*H01L 41/08* (2006.01)
(52) U.S. Cl. ................................. 310/323.02
(58) Field of Classification Search ............. 310/323.02
See application file for complete search history.

(56) References Cited

U.S. PATENT DOCUMENTS 6,841,899 B2 *    1/2005    Kaneko ..................... 310/12

7,271,522 B2 *    9/2007    Yuasa et al. ................ 310/317

* cited by examiner

*Primary Examiner*—Mark Budd
(74) *Attorney, Agent, or Firm*—Scully, Scott, Murphy & Presser, P.C.

(57) ABSTRACT

An actuator includes a vibrating substrate having a first electrode on a surface thereof and configured to be reciprocally moved according to a minute displacement of a vibrator, a moving body arranged on the surface of a vibrating substrate and having a second electrode on a surface thereof which faces the first electrode with an insulating layer disposed therebetween, and a controller configured to move the moving body by applying voltage between the first and second electrodes to exert electrostatic adsorptive force therebetween and controlling frictional force between the vibrating substrate and the moving body. The actuator further includes an electric field reduction area configured to shield an electric field occurring between the first and second electrodes by the voltage applied therebetween in a portion which lies outside the first electrode on the surface of the vibrating substrate and faces the moving body.

8 Claims, 5 Drawing Sheets

ACTUATOR

CROSS-REFERENCE TO RELATED APPLICATIONS

This application is based upon and claims the benefit of priority from prior Japanese Patent Application No. 2006-198257, filed Jul. 20, 2006, the entire contents of which are incorporated herein by reference.

BACKGROUND OF THE INVENTION

1. Field of the Invention

This invention relates to an actuator which synchronizes electrostatic adsorption with the vibration of a piezoelectric element to perform a step-driving operation.

2. Description of the Related Art

As digital cameras are mounted on cellular telephones and portable information devices, it is required to greatly reduce the size of photographic optical modules. In order to meet this requirement, an electrostatic actuator is proposed instead of the conventional electromagnetic actuator.

As one of the electrostatic actuators, an actuator which synchronizes electrostatic adsorption with the vibration of a piezoelectric element to perform a step-driving operation is known as is disclosed in U.S. Pat. No. 6,841,899, for example.

The step-driving actuator includes a substrate extended in a predetermined direction, a vibrating member supported on the substrate vibratably in the predetermined direction, a vibration generating portion configured to vibrate the vibrating member in the predetermined direction, a movable member having a first facing surface confronting the substrate and a second facing surface confronting the vibrating member, a movable electrode disposed at any one of the first facing surface and second facing surface of the movable member, and a counter electrode disposed on any one of the substrate and the vibrating member so as to confront the movable electrode. A potential difference is applied between the movable electrode and the counter electrode to cause an electrostatic force to act such that an apparent sliding resistance between the vibrating member and the movable member is greater than an apparent sliding resistance between the substrate and the movable member when displacing the vibrating member in a desired direction relatively on the substrate by vibrating in the predetermined direction, and thereby the movable member is relatively moved in the desired direction on the substrate.

BRIEF SUMMARY OF THE INVENTION

According to an aspect of the present invention, there is provided an actuator comprising:

a fixing member formed to extend in a predetermined direction;

a vibrator disposed on the fixing member and configured to cause minute displacement in a first direction along the predetermined direction and in a second direction which is opposite to the first direction;

a vibrating substrate having a first electrode on a surface thereof and configured to be reciprocally moved according to the minute displacement of the vibrator;

a moving body arranged on the surface of the vibrating substrate and having a second electrode on a surface thereof which faces the first electrode with an insulating layer disposed therebetween;

a controller configured to move the moving body by applying voltage between the first and second electrodes to exert electrostatic adsorptive force therebetween and controlling frictional force between the vibrating substrate and the moving body; and an electric field reduction area configured to shield an electric field occurring between the first and second electrodes by the voltage applied therebetween in a portion which lies outside the first electrode on the surface of the vibrating substrate and faces the moving body.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

First Embodiments

Figure 1A:
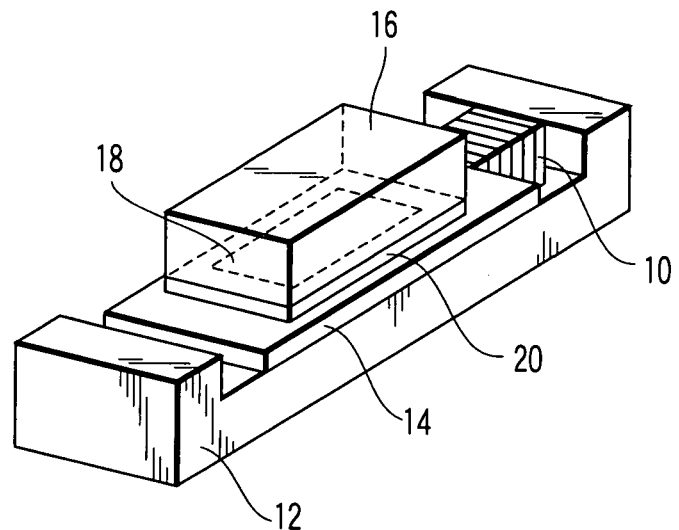
FIG. 1A is a perspective view of an actuator according to a first embodiment of this invention.
Figure 1B:
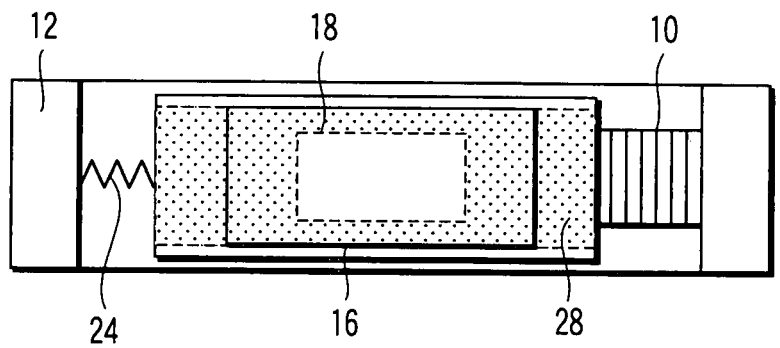
FIG. 1B is a plan view of the actuator according to the first embodiment.
Figure 1C:
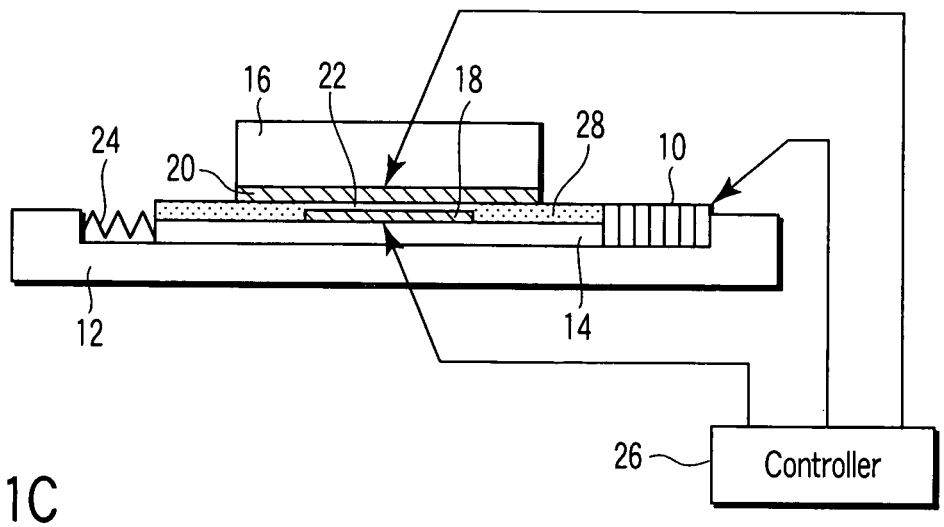
FIG. 1C is a side view of the actuator according to the first embodiment.

As shown in FIGS. 1A, 1B and 1C, in an actuator according to a first embodiment of this invention, one end of a piezoelectric element 10 as a vibrator is fixed on a fixing member 12 and the other end thereof is fixed on one end of a vibrating substrate 14. On the vibrating substrate 14, a moving body 16 which is movable in a vibrating direction of the piezoelectric element 10 is disposed. A first electrode 18 is formed on the surface of the vibrating substrate 14 which faces the moving body 16 and a second electrode 20 is formed on the surface of the moving body 16 which faces the vibrating substrate 14. For easy understanding of the drawing, in FIG. 1C, only the electrodes 18, 20 are shown in a cross-sectional form. This applies to the other drawings explained below.

The first and second electrodes 18, 20 are arranged to face each other while an insulating film 22 which is an insulating layer formed on the first electrode 18 is disposed therebetween. When a potential difference is applied between the first electrode 18 and the second electrode 20, electrostatic adsorptive force is applied between the electrodes. Although not shown in the drawing for brevity of the drawing, guide rails are provided to prevent the moving body 16 from being moved in an undesired direction and into an undesired range and restrict the moving direction and moving range as in the conventional case. Further, the other end of the vibrating substrate 14 is biased towards the piezoelectric element 10 by a bias spring 24.

The following driving voltages are applied to the piezoelectric element 10 and first and second electrodes 18, 20 from a controller 26. For brevity of the drawing, the controller is shown only in FIG. 1C and is not shown in the other drawing (likewise, the controller is not shown in the other drawings explained below).

Figure 2A:
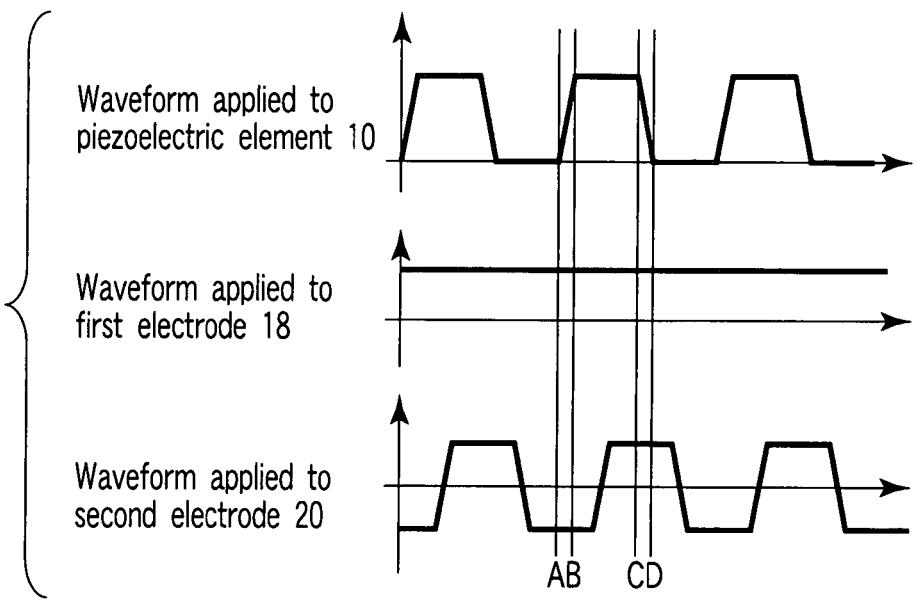
FIG. 2A is a diagram showing driving waveforms when a moving body is moved in a left direction in FIGS. 1B and 1C.
Figure 2B:
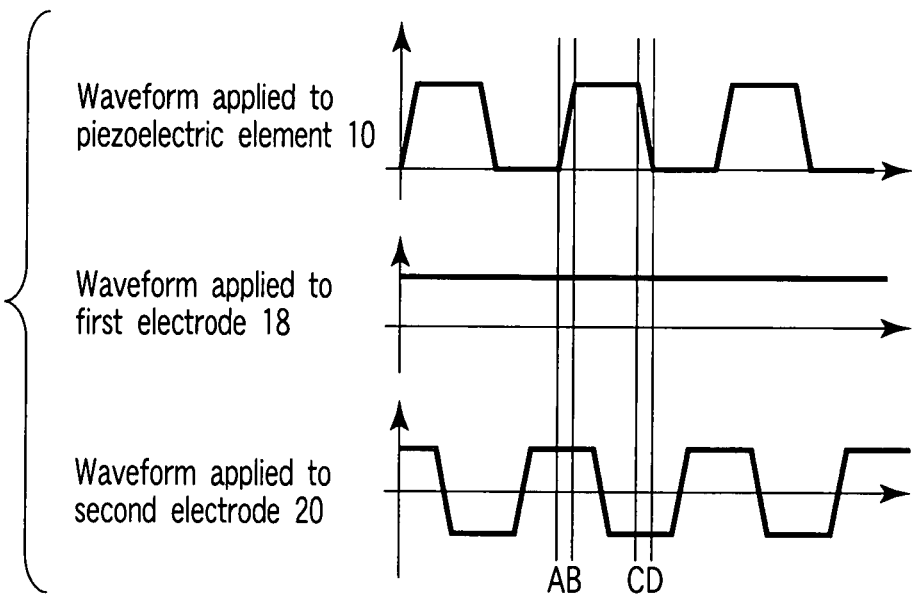
FIG. 2B is a diagram showing driving waveforms when the moving body is moved in a right direction.

FIG. 2A shows a case where the moving body 16 is moved in the left direction in FIGS. 1B and 1C and FIG. 2B shows a case where the moving body 16 is moved in the right direction or in the reverse direction. Next, the driving principle of the actuator is explained with reference to FIG. 2A.

A waveform applied to the piezoelectric element 10 rapidly rises in a period from the time point A to the time point B as shown in FIG. 2A. As a result, the piezoelectric element 10 is rapidly displaced in the left direction and the vibrating substrate 14 is also rapidly moved in the left direction. At the same time, a potential difference occurs between the voltages respectively applied to the first and second electrodes 18 and 20. Therefore, electrostatic adsorptive force is applied between the vibrating substrate 14 and the moving body 16 to increase the frictional force therebetween. As a result, the moving body 16 is also moved in the left direction according to the displacement of the vibrating substrate 14.

Next, the waveform applied to the piezoelectric element 10 rapidly falls in a period from the time point C to the time point D as shown in FIG. 2A. As a result, the piezoelectric element 10 is rapidly contracted and the vibrating substrate 14 is rapidly moved in the right direction accordingly. At this time, since the voltage applied to the first electrode 18 is the same as the voltage applied to the second electrode 20, no electrostatic adsorptive force is applied between the electrodes. As a result, inertial force of the moving body 16 overcomes the frictional force between the vibrating substrate 14 and the moving body 16 and the moving body 16 tends to stay in the present position.

By repeatedly performing the above operation, the moving body 16 moves in the left direction with respect to the vibrating substrate 14.

Further, in order to move the moving body in the right direction, a potential difference may be applied between the electrodes when the piezoelectric element 10 is rapidly contracted as shown in FIG. 2B.

The above explanation is made for the basic operation principle of the actuator. Frictional force is applied in synchronism with piezoelectric vibration. Since the moving body 16 is moved only when the frictional force is increased, the driving efficiency is enhanced. Further, the inertial driving operation can be performed without changing the displacement speed of the piezoelectric element 10 in the right and left directions and the driving waveforms can be simplified.

The configuration of the actuator according to the first embodiment is explained with reference to FIGS. 1B and 1C. In the actuator according to the present embodiment, an electric field reduction area 28 is present in a region which is the surface of the vibrating substrate 14 except a portion corresponding to the first electrode 18 and a portion thereof facing the moving body 16 (in the range in which the moving body 16 is moved). The electric field reduction area 28 is an area in which no electric field is generated. Therefore, even when water is formed by condensation on the above portion due to high humidity, a dielectrophoresis phenomenon does not occur since no electric field occurs. Therefore, the water will not be drawn into between the first and second electrodes 18 and 20. The dielectrophoresis phenomenon is a phenomenon in which water is drawn into the electric field if the water is present near a portion where the strong electric field occurs.

Figure 3A:
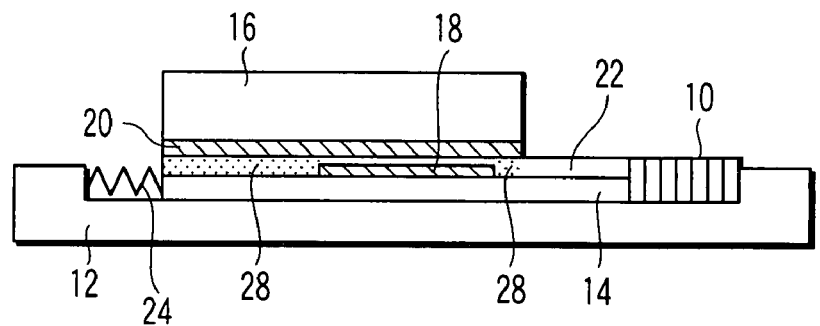
FIG. 3A is a view for explaining an electric field reduction area in a case where the moving body is moved in the left direction.
Figure 3B:
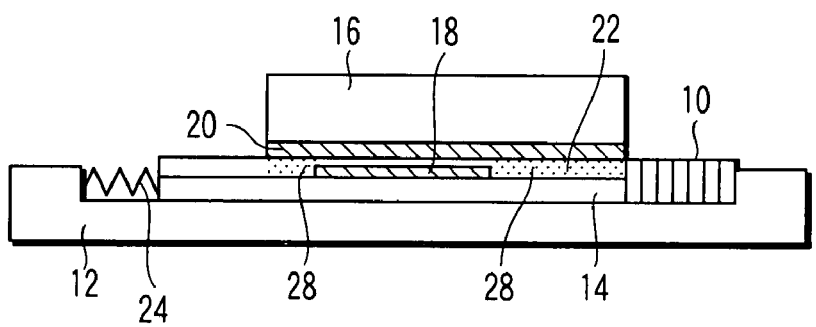
FIG. 3B is a view for explaining the electric field reduction area in a case where the moving body is moved in the right direction.

In the configuration of the present embodiment, an electrode which faces the second electrode 20 is not formed on the electric field reduction area 28. When the moving body 16 has been moved in the left direction as shown in FIG. 3A and when the moving body 16 has been moved in the right direction as shown in FIG. 3B, the electric field reduction area 28 is present on both sides of the first electrode 18 and outside the first electrode 18 (although the plan view is not shown). Therefore, the facing areas of the first and second electrodes 18 and 20 are surrounded with the electric field reduction area 28.

Figure 4:
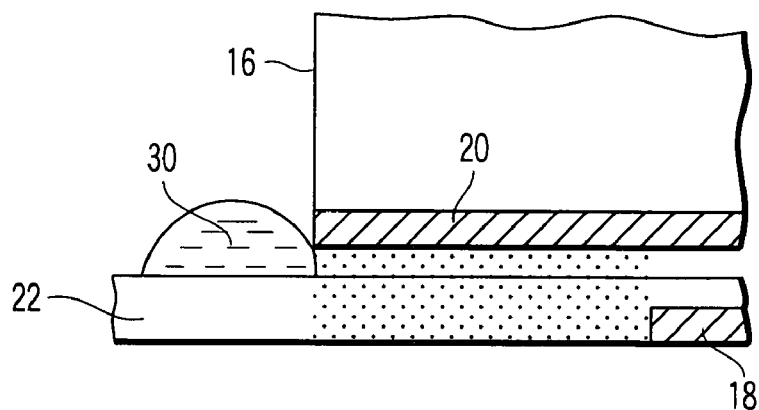
FIG. 4 is an enlarged view showing the electric field reduction area, for illustrating the operation and effect of the actuator according to the first embodiment.

That is, in the present embodiment, as shown in the enlarged view of the electric field reduction area 28 of FIG. 4, a portion of the electric field reduction area 28 which an electrode facing the second electrode 20 is not formed is provided around the first electrode 18. Thus, even when water 30 is formed by condensation on the vibrating substrate 14, the dielectrophoresis phenomenon that water is drawn into between the electrodes does not occur since the strength of the electric field in the electric field reduction area 28 is not set so high as to draw water therein or an electric field does not occur. Therefore, since electrostatic force between the first and second electrodes 18 and 20 does not vary, the ability of the actuator can be fully exhibited even when the inertial drive actuator is used under the high-humidity environment in which water is formed by condensation on the surface of the vibrating substrate 14.

Second Embodiments

Figure 5A:
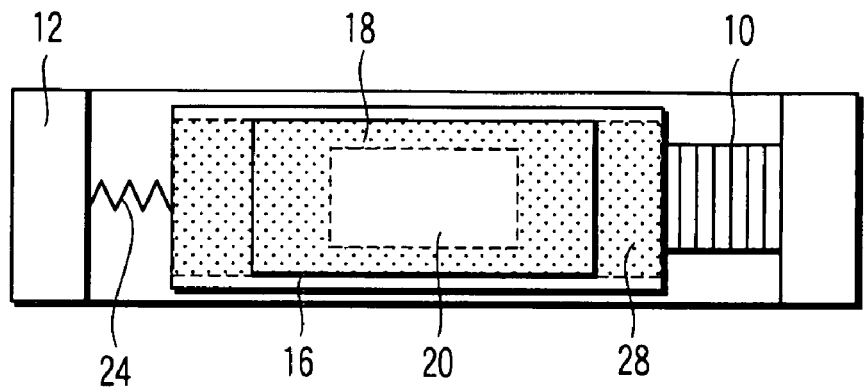
FIG. 5A is a plan view of an actuator according to a second embodiment of this invention.
Figure 5B:
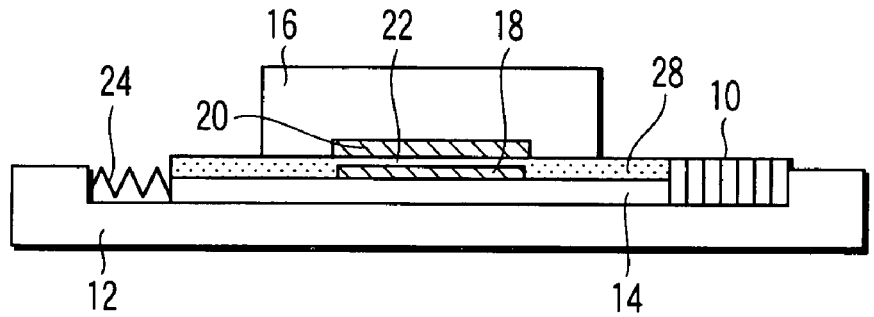
FIG. 5B is a side view of the actuator according to the second embodiment.

As shown in FIGS. 5A and 5B, in an actuator according to a second embodiment of this invention, an electric field reduction area 28 is formed on a portion corresponding to the surface of a moving body 16 excluding a second electrode 20 and the surface of a vibrating substrate 14 facing the moving body 16.

In the first embodiment, the second electrode 20 is contained in the electric field reduction area 28, but in the actuator according to the present embodiment, the second electrode 20 is not contained. Therefore, an electric field between the first and second electrodes 18 and 20 is shielded by the electric field reduction area 28. Thus, since no electric field occurs at all between the facing surfaces of the electric field reduction area 28, a dielectrophoresis phenomenon that water is drawn into between the first and second electrodes 18 and 20 does not occur even when water is formed by condensation on the vibrating substrate. Therefore, the ability of the actuator can be fully exhibited even when the actuator according to the present embodiment is used under the high-humidity environment.

Figure 6:
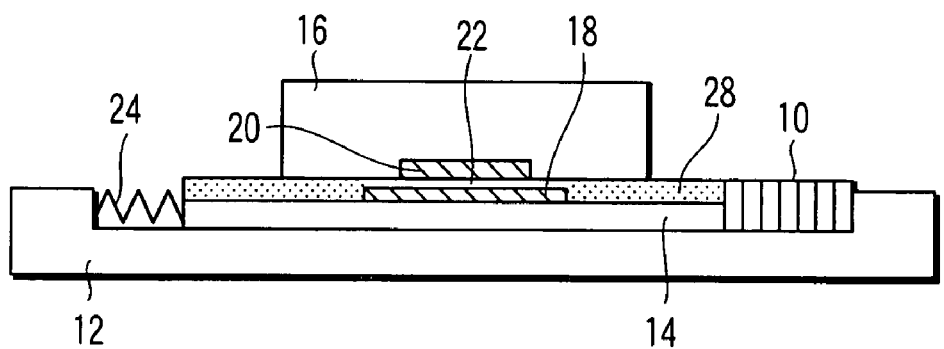
FIG. 6 is a side view of a modification of the actuator according to the second embodiment.

In the present embodiment, the lengths of the facing surfaces of the first and second electrodes 18 and 20 are set to the same length, but as shown in FIG. 6, the facing surface of the second electrode 20 may be made shorter than the facing surface of the first electrode 18.

Third Embodiments

Figure 7A:
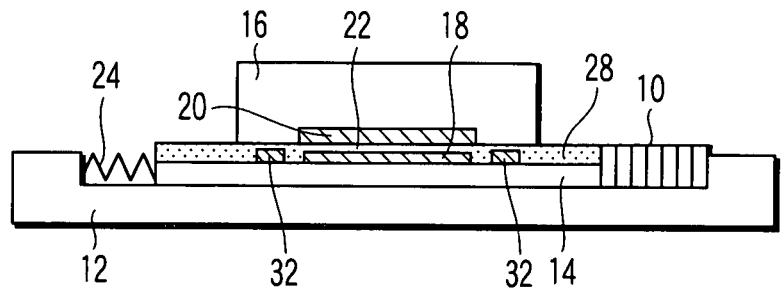
FIG. 7A is a side view of an actuator according to a third embodiment of this invention.
Figure 7B:
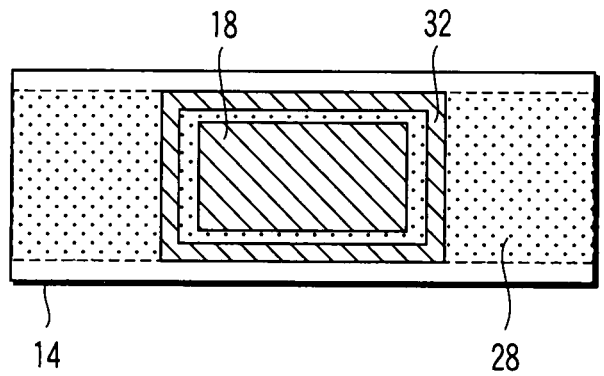
FIG. 7B is a plan view showing a vibrating substrate (the moving body is not shown)

As shown in FIGS. 7A and 7B, in an actuator according to the present embodiment, a ring-form electric field shielding electrode 32 is formed to surround the outer periphery of a first electrode 18 in an electric field reduction area 28. The electric field shielding electrode 32 is formed to face a second electrode 20 arranged on a moving body 16. In FIG. 7B, for easy understanding of the feature of the present embodiment, it should be noted that the moving body 16 on the vibrating substrate 14 is not shown in the drawing.

By arranging the electric field shielding electrode 32 outside the first electrode 18, the same effect as that obtained by arranging one type of a guard electrode can be attained. That is, an electric field occurring between the first and second electrodes 18 and 20 will not leak to the exterior of the electric field shielding electrode 32 by the presence of the electric field shielding electrode 32. Therefore, occurrence of a dielectrophoresis phenomenon can be suppressed and a variation in electrostatic force can be suppressed.

Further, voltage applied to the second electrode 20 is kept applied to the ring-form electric field shielding electrode 32. With the voltage application, potentials of the electric field shielding electrode 32 and the second electrode 20 are set equal and the electric field between the first and second electrodes 18 and 20 can be shielded. Thus, a dielectrophoresis phenomenon does not occur, and therefore, water is not drawn into an inside portion of the electric field shielding electrode 32.

In the embodiments described so far, a measure for preventing occurrence of the dielectrophoresis phenomenon is taken, but it is possible to positively cause a dielectrophoresis phenomenon by use of the electric field shielding electrode 32 and prevent water from being drawn into between the first and second electrodes 18 and 20. As described before, the dielectrophoresis phenomenon is a phenomenon that water is drawn into the electric field if the water is present near a portion where the strong electric field occurs. However, the drawn water is not discharged from the electric field and is stably kept remain in the electric field. The condition is set to generate an electric field between the electric field shielding electrode 32 and the second electrode 20 by applying voltage to cause a potential difference to always occur between the electric field shielding electrode 32 and the second electrode 20. Thus, water 30 is drawn by the electric field between the electric field shielding electrode 32 and the second electrode 20, stably stays in the electric field and is not discharged from the area even if the water 30 is present on the vibrating substrate 14 by condensation or the like. Therefore, the water is not drawn into between the first and second electrodes 18 and 20 and electrostatic force between the first and second electrodes 18 and 20 will not vary.

Figure 8A:
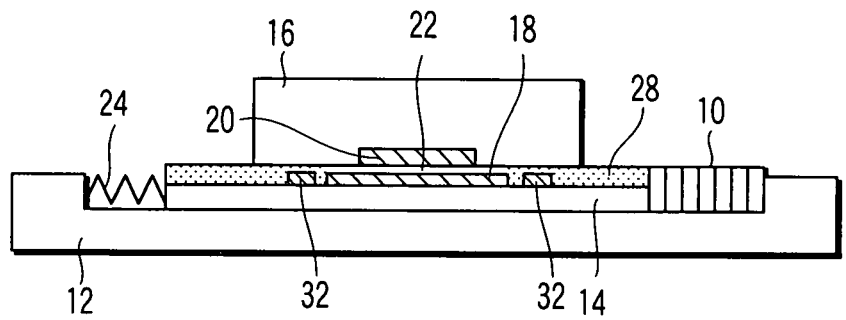
FIG. 8A is a side view of a modification of the actuator according to the third embodiment.
Figure 8B:
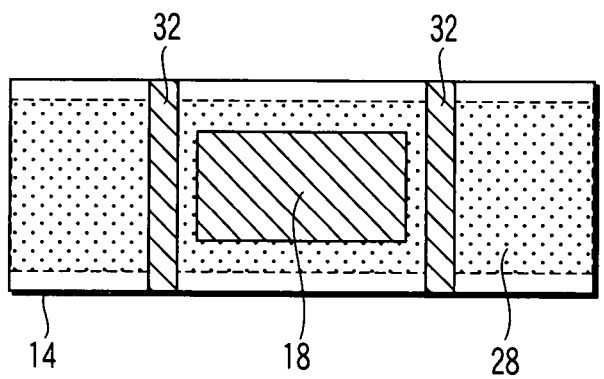
FIG. 8B is a plan view showing a vibrating substrate (the moving body is not shown).

In the third embodiment, the electric field shielding electrode 32 is formed in a ring form, but this invention is not limited to this case. For example, as shown in FIGS. 8A and 8B, the same effect can be attained by arranging electric field shielding electrodes 32 only outside the sides of the first electrode 18 to which the moving body 16 moves. Further, the vibrator is not limited to the piezoelectric element 10.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An actuator comprising:
    a fixing member formed to extend in a predetermined direction;
    a vibrator disposed on the fixing member and configured to cause minute displacement in a first direction along the predetermined direction and in a second direction which is opposite to the first direction;
    a vibrating substrate having a first electrode on a surface thereof and configured to be reciprocally moved according to the minute displacement of the vibrator;
    a moving body arranged on the surface of the vibrating substrate and having a second electrode on a surface thereof which faces the first electrode with an insulating layer disposed therebetween;
    a controller configured to move the moving body by applying voltage between the first and second electrodes to exert electrostatic adsorptive force therebetween and controlling frictional force between the vibrating substrate and the moving body; and
    an electric field reduction area configured to shield an electric field occurring between the first and second electrodes by the voltage applied therebetween in a portion which lies outside the first electrode on the surface of the vibrating substrate and faces the moving body.

2. The actuator according to claim 1, wherein the first electrode faces only an inner portion of the surface of the moving body irrespective of the moving position of the moving body.

3. The actuator according to claim 1, wherein the electric field reduction area is a portion which faces the second electrode on the surface of the vibrating substrate.

4. The actuator according to claim 1, wherein the electric field reduction area is a portion which faces the surface of the vibrating substrate and the surface of the moving body outside the second electrode.

5. The actuator according to claim 1, further comprising an electric field shielding electrode disposed on the surface of the vibrating substrate of the electric field reduction area to face the second electrode and lie outside the first electrode.

6. The actuator according to claim 5, wherein the controller applies the same application voltage as the voltage of the second electrode to the electric field shielding electrode.

7. The actuator according to claim 5, wherein an electric field is always generated by a potential difference between the electric field shielding electrode and the second electrode.

8. An actuator comprising:
    fixing means formed to extend in a predetermined direction;
    vibrating means, disposed on the fixing means, for causing minute displacement in a first direction along the predetermined direction and in a second direction which is opposite to the first direction;

vibrating means, having a first electrode on a surface thereof, for being reciprocally moved according to the minute displacement of the vibrating means;

moving means arranged on the surface of the vibrating means and having a second electrode on a surface thereof which faces the first electrode with an insulating layer disposed therebetween;

control means for moving the moving means by applying voltage between the first and second electrodes to exert electrostatic adsorptive force therebetween and controlling frictional force between the vibrating means and the moving means; and an electric field reduction area for shielding an electric field occurring between the first and second electrodes by the voltage applied therebetween in a portion which lies outside the first electrode on the surface of the vibrating means and faces the moving means.

* * * * *